G. K. GILLETTE.
POULTRY FEEDER.
APPLICATION FILED FEB. 29, 1912.
1,064,315.
Patented June 10, 1913.
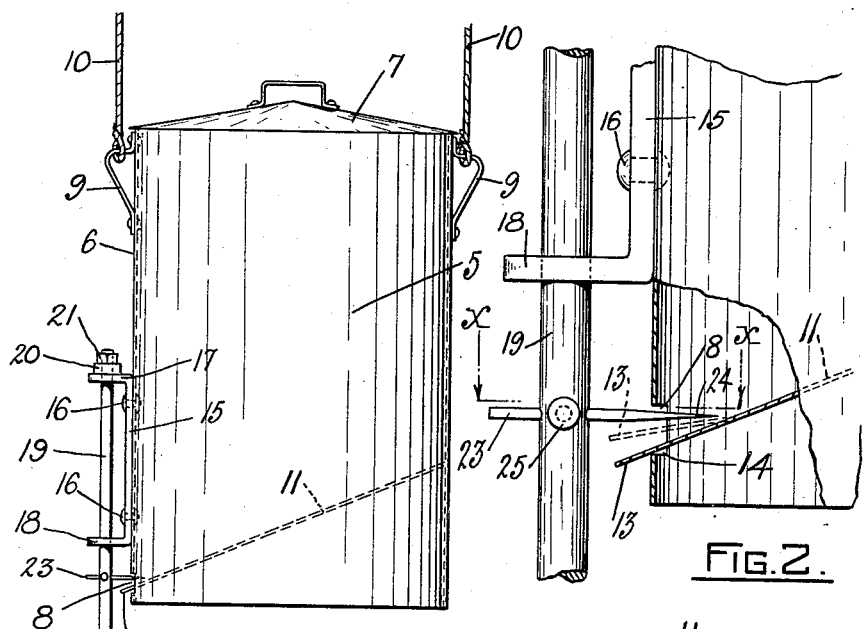
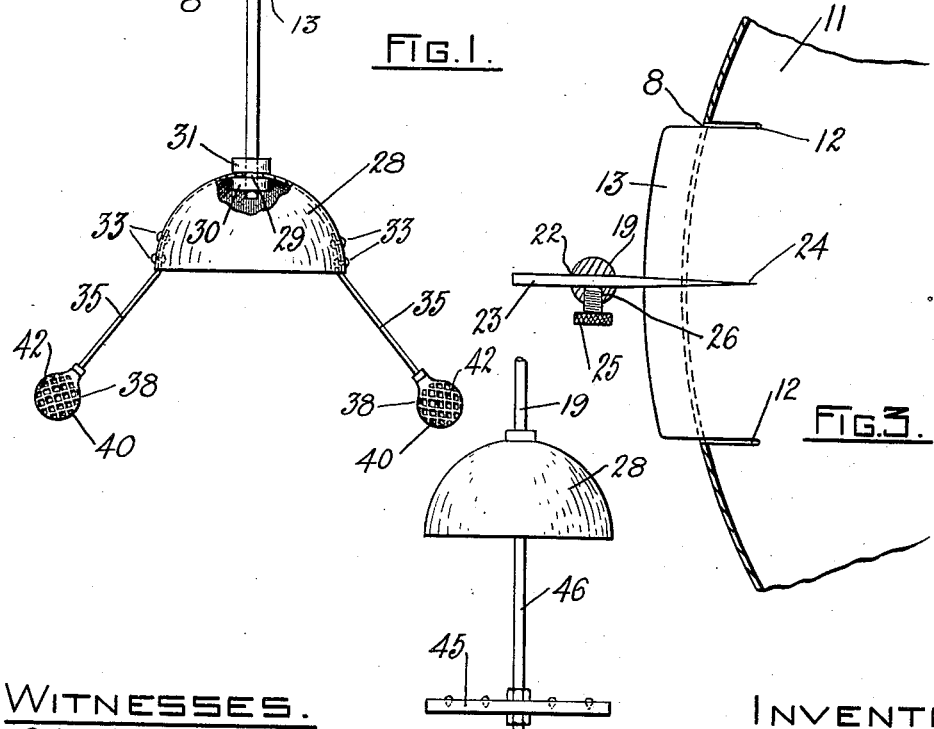
WITNESSES.
INVENTOR.
George K. Gillette
By Horatio E. Bellows
ATTORNEY.
COLUMBIA PLANOGRAPH CO., WASHINGTON, D. C.

UNITED STATES PATENT OFFICE.

GEORGE K. GILLETTE, OF CENTRAL VILLAGE, CONNECTICUT, ASSIGNOR OF ONE-HALF TO FRED W. MORSE COMPANY, A CORPORATION OF RHODE ISLAND.

POULTRY-FEEDER.

1,064,315. Specification of Letters Patent. Patented June 10, 1913.

Application filed February 29, 1912. Serial No. 680,587.

*To all whom it may concern:*

Be it known that I, GEORGE K. GILLETTE, a citizen of the United States, residing at Central Village, in the county of Windham and State of Connecticut, have invented certain new and useful Improvements in Poultry-Feeders, of which the following is a specification.

My invention relates to poultry feeders and exercisers for automatically feeding grain from a receptacle to poultry, and is of that type which comprises a receptacle for the grain, which is fed through an opening in the same by a pin or pointed arm mounted on an operating arm rotatably connected with the receptacle, the needle or arm being adapted to enter the opening in the receptacle and discharge the grain therethrough.

In the described apparatus it has heretofore been impossible to discharge from the same receptacle a large sized grain adapted for large birds and small sized grain adapted for chickens, since the opening in the receptacle through which the grain is discharged is constant in size.

It is the object of my invention to overcome the recited difficulty; to attain this end by means of simple construction and of facile manipulation.

A further object of my invention is to facilitate the rotation of the operating shaft whereby a less degree of power is required to actuate the same; and to provide bait means particularly adapted to be free of the bodies of the birds, and which bait means is non-injurious to the bills of the birds when put in operation.

To the above ends essentially my invention consists in such parts and combinations of parts as fall within the scope of the appended claims.

In the accompanying drawings which form a part of this specification, and in which like reference characters indicate like parts throughout the views,—Figure 1 is a side elevation of my novel feeder, Fig. 2, an enlarged side elevation of a portion of the same adjacent the discharge opening of the receptacle, showing a portion of the latter broken away, Fig. 3, a section taken on line *x x* of Fig. 2, and Fig. 4, a side elevation of a common form of bait bar and operating rod.

My apparatus in the present form and improved embodiment comprises a cylindrical receptacle 5, provided with a side wall 6 supporting a cover 7, and provided near the bottom of this side wall with an oblong opening 8. Upon diametrically opposite parts of the upper portion of the receptacle are fixed straps 9, adapted to receive the ends of suspension ropes 10. Fixed by solder or otherwise to the inner face of the wall 6 of the receptacle is an inclined plate 11 of bendable or pliable material constituting the floor of the receptacle, provided with interspaced marginal slits 12 to facilitate the operation of a tongue 13 integral with the plate 11 and projecting beyond the margin thereof through the opening 8 in the receptacle. When the tongue is in alinement with the remainder of the plate or floor 11, it extends through the opening 8 contiguous to or near the lower edge of the opening, as at 14. The opening 8 may for the purpose of discharge be made broader or narrower by manually bending the lip 13 upwardly into some such position as that shown in broken lines in Fig. 2. A result of such an opening is to control the depth of the orifice at will, and in accordance with the size of the particles of grain desired to be fed to any particular size of bird. When large birds are to be fed, large grain, which is required in such cases, is placed in the receptacle 5, and the lip 13 is downwardly bent thus enlarging the discharge opening. When smaller birds are to be fed, finer grain replaces that first described, and the tongue 13 is upwardly bent, thus narrowing the discharge orifice.

The operating mechanism of my apparatus comprises a bracket plate 15 fixed by rivets 16 or otherwise to the exterior of the receptacle in vertical alinement with the center of the opening 8. The bracket is provided at its upper and lower ends, respectively, with the bearings 17 and 18, in which is rotatably mounted an operating shaft 19, supported by a roller bearing plate 20, fixed to its upper end and resting upon the top of the bearing 17. The nut 21 upon the upper extremity of the arm rests upon the bearing plate 20. It will be understood that the roller bearing plate 20 may be omitted, if desired, but it is found that this greatly facilitates the rotation of the bearing shaft 19. In a diametrical opening 22, through the operating shaft 19, is slidably mounted an arm 23, provided with a pointed end 24, adapted to extend into the opening 8 above the plane of the lip 13. A set screw 25 in an opening 26 in the rod serves to retain the arm or needle 22 in any position of horizontal adjustment.

The curved deflector 28 is provided with an opening 29 through its center to admit the lower end of the shaft 19, upon whose lower end is fixed a nut 30 which coöperates with a second nut 31 upon the rod above the deflector to hold the latter in place. It will be understood, however, that the deflector may be attached to the lower end of the rod in any convenient manner.

Fixed by rivets 33 or otherwise to diametrically opposite portions of the lower margin of the deflector are outwardly inclined arms 35, to whose ends are fixed circular bulbs 38, preferably of rubber, provided with a plurality of openings 40 adapted to disclose the grain 42 contained within the bulbs and which serve as bait to induce the birds to strike the balls or bulbs with their bills. The bait members, being composed of rubber or other resilient or yielding material, do not injure the beaks of the birds; and the attachment of the inclined arms 35 to the deflector itself not only conveniently locates the bait members relatively to the bodies of the birds, but also steadies the rotation of the shaft 19, so that the latter is less liable to be vibrated in its bearings when the bait member is struck.

In Fig. 4 is shown a form of bait bar 45 fixed at right angles to an extended portion 46 of the operating shaft 19. It is obvious that this form of bait member may be employed in my apparatus effectively so far as concerns the discharge of grain from the receptacle, but possesses all the disadvantages sought to be avoided by the construction of bait members and arms constructed and located as shown in Fig. 1.

What I claim is,—

1. In a poultry feeder, the combination of a grain receptacle provided with an opening, bearings upon the receptacle, an operating shaft freely rotatably mounted in the bearings, and an arm upon the shaft extending into the opening.

2. In a poultry feeder, the combination of a grain receptacle provided with an opening, a bendable tongue governing the discharge of the grain mounted on the receptacle and intersecting the opening, bearings upon the receptacle, a rotatable operating shaft mounted in the bearings, and a horizontally disposed arm upon the shaft adapted to enter the opening, said shaft being disposed outside of said receptacle.

3. In a poultry feeder, the combination of a grain receptacle comprising a casing provided with an opening and a floor, a tongue upon the floor intersecting the opening and bendable to vary the discharge opening, bearings upon the casing, a rotatable operating shaft mounted in the bearings, and a horizontally disposed arm upon the shaft adapted to enter the opening, said shaft being disposed outside of said receptacle.

4. In a poultry feeder, the combination of a grain receptacle comprising a casing provided with an opening and an inclined floor, a bendable tongue upon the floor intersecting the opening, bearings upon the casing, a rotatable operating shaft mounted upon the bearings, and a horizontally disposed arm upon the shaft extending into the opening, said shaft being disposed outside of said receptacle.

5. In a poultry feeder, the combination of a grain receptacle comprising a casing provided with an opening and an inclined floor fixed to the casing, a bendable tongue integral with the floor and extending through the opening, bearings upon the wall, an operating shaft mounted in the bearings, and an arm upon the shaft adapted to enter the opening above the tongue.

6. In a poultry feeder, the combination of a grain receptacle provided with an opening, an inclined bottom therefor having a bendable tongue, bearings upon the receptacle, an operating shaft rotatably mounted in the bearings, an arm upon the shaft extending into the opening, a deflector upon the shaft below the receptacle, and a downwardly extending arm upon the deflector.

7. In a poultry feeder, the combination of a grain receptacle provided with an opening, an inclined bottom therefor having a bendable tongue, bearings upon the receptacle, an operating shaft rotatably mounted in the bearings exterior of the receptacle, an arm upon the shaft extending into the opening, a deflector upon the shaft below the receptacle, a downwardly and outwardly inclined arm upon the deflector, and a bait member upon the arm.

8. In a poultry feeder, the combination of a grain receptacle provided with an opening, an inclined bottom therefor having a bendable tongue, bearings upon the receptacle, an operating shaft rotatably mounted in the bearings, an arm upon the shaft extending into the opening, a deflector upon the shaft below the receptacle, downwardly inclined arms upon the deflector, and bait members upon the inclined arms comprising a hollow body adapted to hold bait and provided with openings.

9. In a poultry feeder, the combination of a grain receptacle provided with an opening, an inclined bottom therefor having a bendable tongue, bearings upon the receptacle, an operating shaft rotatably mounted in the bearings, an arm upon the shaft extending into the opening, a deflector upon the shaft below the receptacle, downwardly inclined arms upon the deflector, and bait members upon the inclined arms comprising hollow yielding bodies provided with openings.

10. In a poultry feeder, a grain receptacle provided with a side opening, an inclined bendable plate constituting the floor of said receptacle and extending through said opening and having a slitted portion forming a tongue to vary the size of the discharge opening, a shaft rotatably mounted in bearings on said receptacle, and a lateral arm on said shaft extending through said opening into the receptacle above such inclined bendable plate.

11. In a poultry feeder, a receptacle having a side opening, a shaft mounted in bearings upon said receptacle, a lateral arm on said shaft extending into said opening, an adjustable floor for said receptacle projecting through said opening beneath said arm and a curved deflector on said shaft beneath said opening, and bait members depending from and carried by said deflector.

In testimony whereof I have affixed my signature in presence of two witnesses.

GEORGE K. GILLETTE.

Witnesses:
HORATIO E. BELLOWS,
FRED W. PERKINS.

Copies of this patent may be obtained for five cents each, by addressing the "Commissioner of Patents, Washington, D. C."